UNITED STATES PATENT OFFICE.

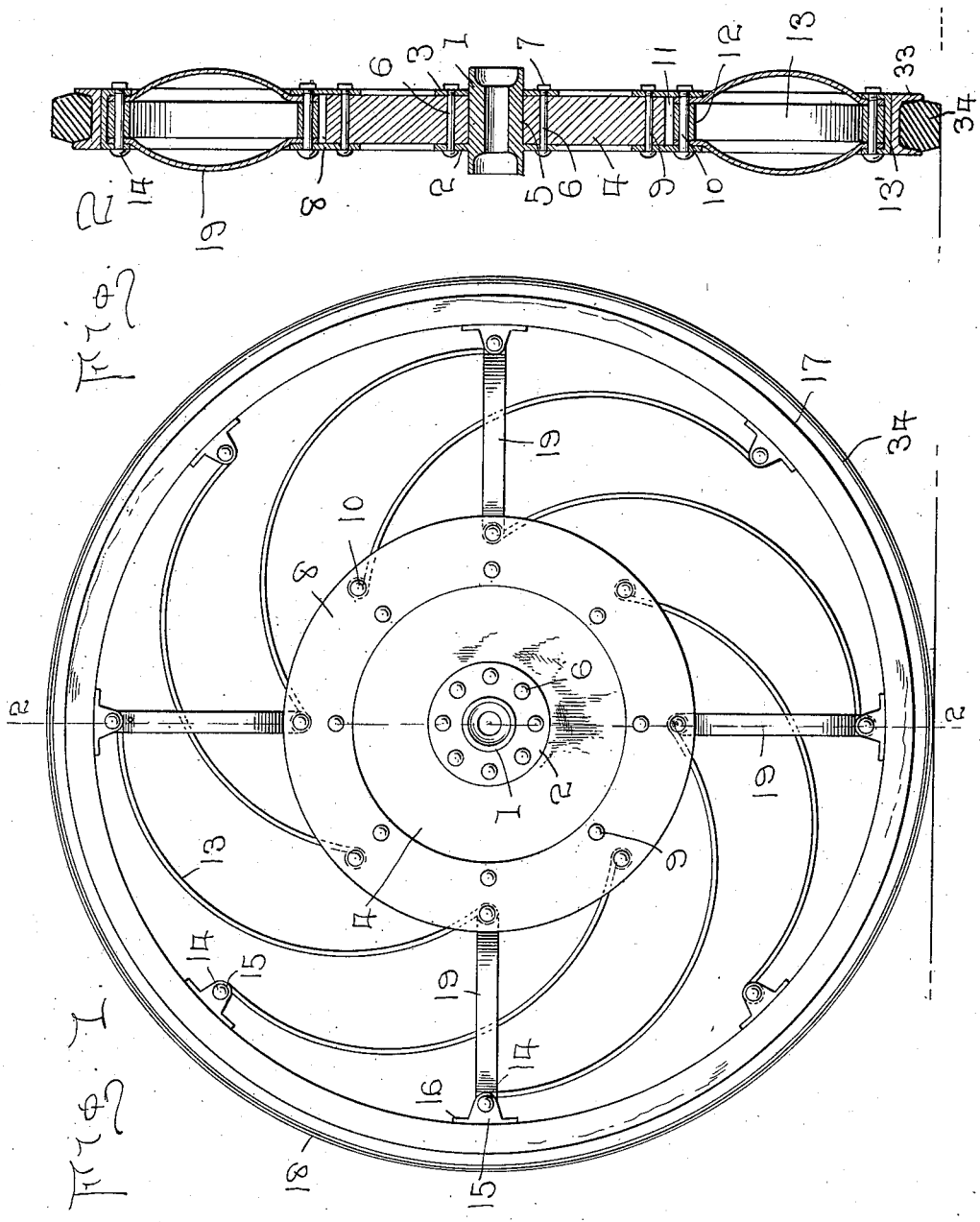

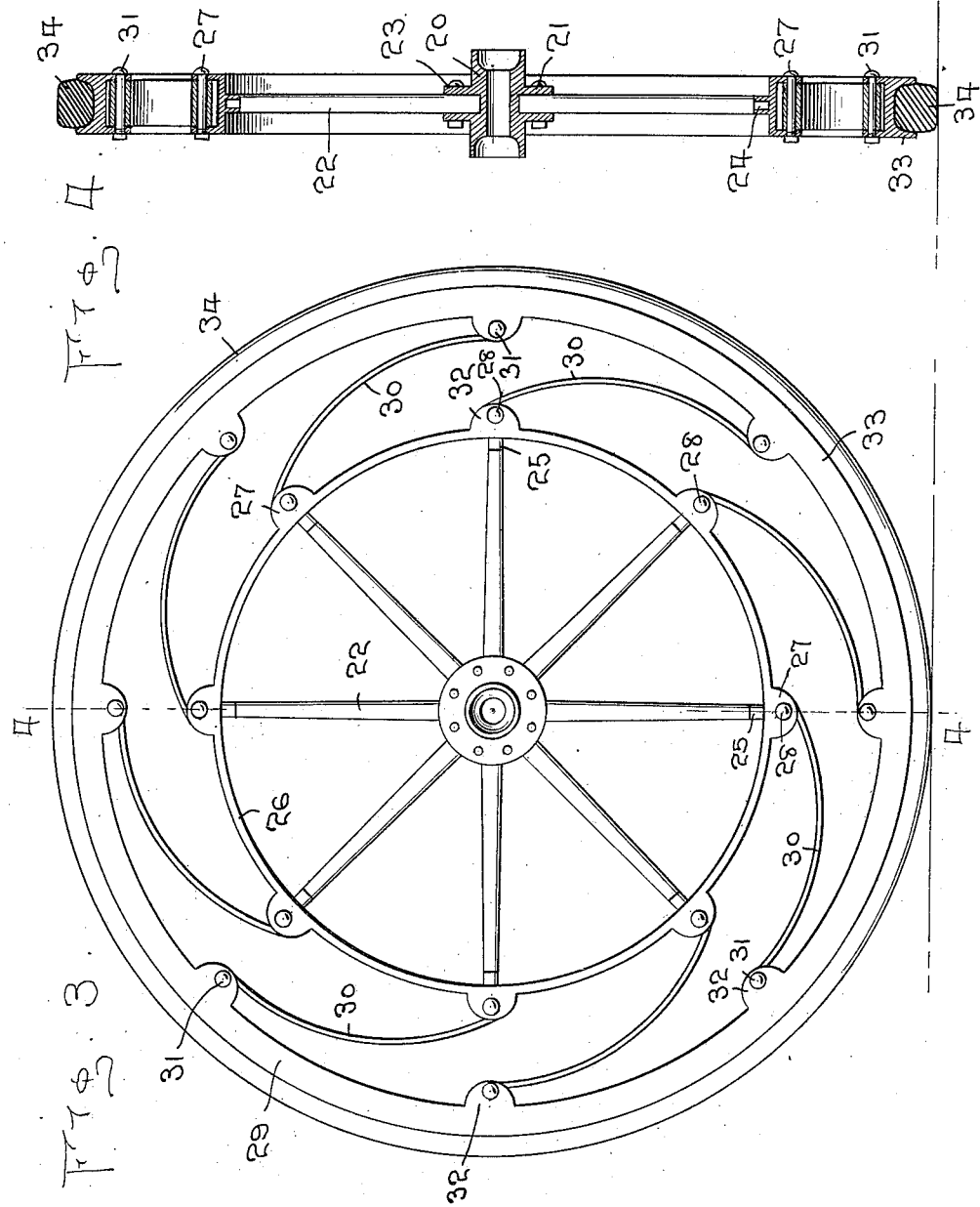

BENNIE P. HANSON, OF ELMORE, MINNESOTA, ASSIGNOR OF ONE-HALF TO CHARLES D. WILLIAMS, OF ELMORE, MINNESOTA.

SPRING-WHEEL.

1,036,097.  Specification of Letters Patent.  Patented Aug. 20, 1912.

Application filed November 17, 1911. Serial No. 660,777.

*To all whom it may concern:*

Be it known that I, BENNIE P. HANSON, citizen of the United States, residing at Elmore, in the county of Faribault and State of Minnesota, have invented certain new and useful Improvements in Spring-Wheels; and I do hereby declare the following to be a full, clear, and exact description of the invention, such as will enable others skilled in the art to which it appertains to make and use the same.

This invention relates to wheels and more particularly to that class of wheels known as spring wheels.

An object of the invention is to provide a wheel with a main or central portion having a circumferential groove and a felly spaced therefrom and connected by means of a series of curved springs having inner ends pivoted within the circumferential groove while their outer ends are pivoted between bracket ears carried upon the inner face of the felly.

Another object is to provide a wheel of this character, portions of which may be composed of metal while the other parts consist of wood serving to space the metallic parts from one another and thus produce a wheel which will be noiseless in use.

Another object is to produce a wheel of the above stated character which will effectively absorb all shocks and which will have the metallic parts spaced from one another to prevent frictional contact thereof, the wheel also being constructed in such manner that the bending of the curved springs will be limited.

Another object is to provide a resilient wheel of this type which will be adapted for use upon motor vehicles, carriages, etc., and which may be employed in connection with any form of hub or axle.

Other objects and advantages will be hereinafter set forth and pointed out in the specification and claim.

In the accompanying drawings which are made a part of this application, Figure 1, is an elevational view of the wheel, and, Fig. 2, is a cross sectional view on the line 2—2 of Fig. 1, Fig. 3, is a view similar to Fig. 1, showing a slightly modified form, and, Fig. 4, is a cross sectional view on the line 4—4, Fig. 3.

Referring more particularly to the drawings in which similar reference numerals designate corresponding parts throughout the several views, 1 represents a metallic hub of ordinary form having the circular flange 2 integral therewith near one end and extending at a right angle thereto, while 3 is a removable flange or ring which is adapted to be secured upon the hub near the end opposite to that upon which the flange 2 is integral.

Between the flanges 2 and 3 is placed a solid member or filling 4 provided with a circular central opening 5 to accommodate the hub 1. The member 4 is held in position by means of the bolts 6 passed therethrough and through the flanges 2 and 3, said bolts also serving to hold or retain the flange 3 in proper position parallel with the flange 2. It will be understood that suitable nuts 7 or other means may be secured upon the threaded ends of the bolts 6 to prevent the latter from working out of place.

The solid member 4 may be composed of any suitable material preferably wood and secured upon opposite sides of this member near the periphery thereof are the metallic rings 8 which extend for some distance beyond the periphery of the member 4 and are held in position by suitable bolts or other securing means 9 passed therethrough and through the member 4. By extending the rings 8 beyond the periphery of the solid member 4 a circumferential groove or channel 11 is provided around the member 4 and projecting through this channel or groove are the pivot bolts 10 which are secured through the rings 8 near the outer edges thereof and upon the pivot bolts 10, within the channel 11 are fastened the turned inner ends 12 of the curved springs 13. The outer turned ends 13' of the curved springs 13 are fastened around the pivot bolts 14, between the ears 15 of the brackets 16, which latter are suitably secured to the inner face of the felly 17. The felly 17 is preferably composed of wood or other like material and may have a flat rim 18 secured upon its outer face or a rim or tire of any type desired.

The curved springs 13 are preferably of such length and curvature as to be secured in place so that their inner ends are fastened around the pivot bolts 10 located about one fourth the distance around the member 4 from the point at which their outer ends 13' are located. Suitable bowed springs 19 are located at each fourth the distance around the solid member 4, said springs being arranged in pairs and the springs of each pair being oppositely bowed. The inner ends of these springs are secured upon the proper pivot bolts 10 while their outer ends are similarly fastened over the pivot bolts 14 directly and diametrically opposite pivot bolts 10 to which the inner ends of said springs are secured. It will be seen that by this arrangement of curved springs 13 and bowed springs 19 there will be one curved spring 13 working through each pair of bowed springs 19 and the outer ends of each pair of bowed springs will be secured to the same pivot bolt 14 as the outer end of one curved spring 13 while the inner ends of said bowed springs will be carried by the same pivot bolt 10 as is the inner end of the second curved spring 13 from the first mentioned curved spring 13. Thus it will be evident that the resilient movement of the curved springs 13 and the giving thereof will be limited by the bowed springs 19. The bowed springs 19, however, will not afford any jerky actions of the springs 13, but will tend to increase the efficiency thereof. The solid wood member 4 serves to space the metallic springs 13 and 19 from the metallic hub 1 and the wood felly 17 spaces the springs 13 and 19 from the rim or tire 18. As the springs 13 work freely through the bowed springs 19 and said springs 13 and 19 are spaced from the other metallic parts of the wheel, it will be evident that said wheel will be noiseless when in use.

The springs 13 and 19 may be formed of any suitable metal and if desired, the flat rings 8 may be increased or decreased in width or may be dispensed with and metallic plates substituted, said plates, if used should extend for about the same distance beyond the periphery of the solid member 4 as do the rings 8. The diameter of the solid member 4 may also be increased or decreased, if desired. The varying of the diameter of the solid member 4 will, however, also necessitate shortening or lengthening of the springs 13 and 19.

The second or modified form shown in Figs. 3 and 4 comprises an inner hub 20 having parallel flanges 21 projecting therefrom, between which the inner ends of the spokes 22 are secured by means of suitable bolts 23 passed through the flanges 21 preferably between the spokes 22. The outer ends of the spokes 22 are reduced, as shown at 24 and secured in the sockets 25 provided therefor, on the inner face of the hoop 26, which latter is preferably formed of suitable metal and has pairs of perforated ears 27 projecting outwardly from the opposite edges thereof to receive the bolts 28. The hub 20, flanges 21, spokes 22, bolts 23 and hoop 26 carrying the socket 25 and ears 27, form an inner wheel, as will be later clearly understood. The inner wheel is connected with the felly 29 and the outer wheel, which has a diameter much greater than that of the hoop 26, by means of the curved springs 30 having their inner ends secured around the bolts 28 between the ears 27 and their outer ends wrapped around the bolts 31 positioned through the pairs of ears 32 directed toward the hoop 26 and integral with the felly 29 of the outer wheel. The complete outer wheel comprises the felly 29 carrying the ears 32 and the flanges 33, and the tire 34 positioned between the flanges 33 which are directed outwardly, in the usual manner for receiving the tire 34 therebetween. In this construction, the curved springs 30, which are shorter than in the first form, extend only about half as far between the parts carrying the bolts to which the opposite ends of the springs are secured. It will also be noted that the bowed springs 19 are dispensed with in this second form and that the inner ends of the curved springs and the bolts to which said inner springs are secured are much narrower than the outer ends of the adjacent springs and those to which said outer ends are secured.

The construction and operation of both forms is identically the same, the only difference being in the exact detail of construction of the minor parts and the varying in dimensions of the principal parts. It will also be evident that any form of hub may be employed and that this construction of resilient wheel may be adapted for use upon motor vehicles, carriages, wagons, or in fact for any purpose for which a resilient wheel may be desired.

Owing to the extreme simplicity of this construction and simple formation of the small number of parts employed, the entire wheel may be manufactured at a small cost and should any of the parts become worn or broken they may be readily and cheaply replaced.

What I claim is:

A resilient wheel comprising a hub, a block surrounding said hub and having a circumferential groove, pivotal points secured through the walls of said groove, a felly carrying brackets upon its inner face, radially disposed spring spokes pivoted to either side of the wheel between said pivotal points and brackets and having the central portions thereof curved outwardly from a radial plane of the wheel, curved springs pivoted between said pivotal points and brackets and disposed between said spring spokes.

In testimony whereof I have signed my name to this specification in the presence of two subscribing witnesses.

BENNIE P. HANSON.

Witnesses:
C. D. WILLIAMS,
H. E. ABBOTT.

Copies of this patent may be obtained for five cents each, by addressing the "Commissioner of Patents, Washington, D. C."